United States Patent
Wang et al.

(10) Patent No.: US 9,917,872 B2
(45) Date of Patent: Mar. 13, 2018

(54) METHOD AND APPARATUS FOR PERFORMING ADAPTIVE STREAMING ON MEDIA CONTENTS

(71) Applicant: Futurewei Technologies, Inc., Plano, TX (US)

(72) Inventors: Xin Wang, Rancho Palos Verde, CA (US); Shaobo Zhang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/158,477

(22) Filed: Jan. 17, 2014

(65) Prior Publication Data
US 2014/0207907 A1   Jul. 24, 2014

Related U.S. Application Data

(60) Provisional application No. 61/754,442, filed on Jan. 18, 2013.

(51) Int. Cl.
*G06F 15/16* (2006.01)
*H04L 29/06* (2006.01)

(52) U.S. Cl.
CPC ........ *H04L 65/602* (2013.01); *H04L 65/4084* (2013.01); *H04L 65/608* (2013.01); *H04L 65/80* (2013.01)

(58) Field of Classification Search
CPC ... H04L 65/4084; H04L 65/607; H04L 65/80; H04L 65/602
See application file for complete search history.

(56) References Cited

U.S. PATENT DOCUMENTS

| 2005/0100100 | A1 | 5/2005 | Unger |
| 2010/0131671 | A1 | 5/2010 | Kohli et al. |
| 2011/0268178 | A1* | 11/2011 | Park et al. ............... 375/240.02 |
| 2011/0307581 | A1* | 12/2011 | Furbeck et al. .............. 709/219 |

(Continued)

FOREIGN PATENT DOCUMENTS

| CN | 1926861 A | 3/2007 |
| CN | 102439579 A | 5/2012 |

(Continued)

OTHER PUBLICATIONS

Raphael Troncy et al.: "Media Fragments URI 1.0 (basic)", Sep. 25, 2012, 20 pages.

(Continued)

*Primary Examiner* — Nicholas Taylor
*Assistant Examiner* — Sanjoy Roy
(74) *Attorney, Agent, or Firm* — Conley Rose, P.C.

(57) ABSTRACT

In an adaptive steaming system, a media server for performing adaptive streaming on media contents sends to a client device a media presentation description (MPD) file including information specifying streaming adaptation parameters. The media server receives a request from the client device. The request includes a data object location indicator and a query string containing at least one of the values of the streaming adaptation parameters. After receiving the request, the media server selects a data object to be returned to the client device based on at least one of the data object location indicator and the query string and sends a response with the data object to the client device.

24 Claims, 4 Drawing Sheets

(56) References Cited

U.S. PATENT DOCUMENTS

| | | | |
|---|---|---|---|
| 2012/0042090 A1* | 2/2012 | Chen et al. | 709/231 |
| 2012/0110120 A1 | 5/2012 | Willig et al. | |
| 2012/0192080 A1* | 7/2012 | Lloyd | G06F 17/30905 715/744 |
| 2012/0259946 A1* | 10/2012 | Stockhammer | H04L 65/105 709/217 |
| 2012/0272281 A1* | 10/2012 | Ha et al. | 725/110 |
| 2013/0124749 A1* | 5/2013 | Thang | H04L 65/4092 709/231 |
| 2013/0166771 A1 | 6/2013 | Thang et al. | |
| 2013/0268577 A1* | 10/2013 | Oyman | H04L 65/4092 709/203 |

FOREIGN PATENT DOCUMENTS

| | | |
|---|---|---|
| KR | 20120060733 A | 6/2012 |
| WO | 2011038013 A2 | 3/2011 |
| WO | 2012011743 A2 | 1/2012 |
| WO | 2012138895 A1 | 10/2012 |

OTHER PUBLICATIONS

Foreign Communication From a Counterpart Application, Korean Application No. 10-2015-7021951, Korean Office Action dated Mar. 16, 2016, 5 pages.

Foreign Communication From a Counterpart Application, Korean Application No. 10-2015-7021951, English Translation of Korean Office Action dated Mar. 16, 2016, 4 pages.

"Information Technology—Dynamic adaptive streaming over HTTP (DASH) Part 1: Media Presentation description and segment formats," ISO/IEC JTC1/SC 29, ISO/IEC 23009-1:2012(E), Jan. 5, 2012, 133 pages.

Sodagar, I., et al., "Reinventing multimedia delivery with MPEG-DASH," Proc. of SPIE, vol. 8135, 2011, 7 pages.

Sodagar, I., et al., "The MPEG-DASH Standard for Multimedia Streaming Over the Internet," Industry and Standards, 2011, pp. 62-67.

Stockhammer, T., "Dynamic Adaptive Streaming over HTTP—Design Principles and Standards," Nov. 2010, 3 pages.

Stockhammer, T., "MPEG's Dynamic Adaptive Streaming over HTTP (DASH)—Enabling Formats for Video Streaming over the Open Internet," Nov. 22, 2011, 54 pages.

Wang, X., et al., "Contribution to Dash Core Experiment on Parameter Insertion in URL," ISO/IEC JTC1/SC29/WG11/MPEG2012/m28174, Jan. 2013, 5 pages.

Foreign Communication From a Counterpart Application, Japanese Application No. 2015-553863, Japanese Office Action dated Oct. 4, 2016, 4 pages.

Foreign Communication From a Counterpart Application, Japanese Application No. 2015-553863, English Translation of Japanese Office Action dated Oct. 4, 2016, 5 pages.

Foreign Communication From a Counterpart Application, Chinese Application No. 201480005130.2, Chinese Office Action dated Sep. 27, 2016, 6 pages.

Foreign Communication From a Counterpart Application, Chinese Application No. 201480005130.2, Chinese Search Report dated Sep. 14, 2016, 3 pages.

* cited by examiner

METHOD AND APPARATUS FOR PERFORMING ADAPTIVE STREAMING ON MEDIA CONTENTS

CROSS-REFERENCE TO RELATED APPLICATION

This application claims priority of provisional application No. 61/754,442, filed Jan. 18, 2013 and titled "System and Method for Server-Managed Adaptive Streaming," which is incorporated herein by reference in its entirety.

BACKGROUND

Dynamic adaptive streaming over hypertext transfer protocol (HTTP) (DASH) may be designed to enable efficient delivery of multimedia services, in the form of media presentation definitions (MPD)-guided and segment-based streaming, because of its leverage on the existing Internet infrastructure, such as HTTP-based content distribution networks (CDNs).

The dynamic adaptive streaming enabled by DASH is driven and managed by the client. In a client-managed adaptive streaming, it may be the client that not only selects a set of Adaptation Sets and one specific Representation within each Adaptation Set and makes requests for segments therein, but also makes decisions such as on Representation switching, updated MPD fetching, and encoder clock drift control. These selections and decisions are supposed to be made to suit for the client environment based on information provided in the MPD (e.g., bandwidth of each selected Representations), static characteristics of the environment (e.g., client decoding and rendering capabilities), and dynamic characteristics the client monitors about its changing environment (e.g., available bandwidth of the network connection).

SUMMARY

Embodiments of the present invention provide an apparatus, method and a non-transitory computer-readable medium, for performing adaptive streaming on media contents.

A media server for performing adaptive streaming on media contents sends to a client device a media presentation description (MPD) file including information specifying streaming adaptation parameters. The media server receives a request from the client device. The request includes a data object location indicator and a query string containing at least one of the values of the streaming adaptation parameters. After receiving the request, the media server selects a data object to be returned to the client device based on at least one of the data object location indicator and the query string of the request and sends a response with the data object to the client device.

A method for performing adaptive streaming on media contents by a media server, in which the media server sends to a client device a media presentation description (MPD) file including information specifying streaming adaptation parameters. The media server receives a request from the client device. The request includes a data object location indicator and a query string containing at least one of the values of the streaming adaptation parameters. After receiving the request, the media server selects a data object to be returned to the client device based on at least one of the data object location indicator and the query string and sends a response with the data object to the client device.

A non-transitory computer-readable medium storing instructions executable by a processor in a media server to perform operations is provided. The operations includes: sending to a client device a media presentation description (MPD) file including information specifying streaming adaptation parameters; receiving a request from the client device, where the request includes a data object location indicator and a query string containing at least one of the values of the streaming adaptation parameters; after receiving the request, selecting a data object to be returned to the client device based on at least one of the data object location indicator and the query string and sending a response with the data object to the client device.

BRIEF DESCRIPTION OF THE DRAWINGS

To illustrate the technical solutions in the embodiments of the present invention or in the prior art more clearly, the following briefly describes accompanying drawings required for describing the embodiments or the prior art.

DETAILED DESCRIPTION OF THE EMBODIMENTS

To make the objectives, technical solutions, and advantages of the present invention more clear, the following clearly and completely describes the technical solutions according to the embodiments of the present invention with reference to the accompanying drawings in the embodiments of the present invention.

In general, this disclosure describes techniques for adaptively streaming media data, such as audio and video data, over a network. The techniques of this disclosure may be used in conjunction with adaptive streaming, e.g., Dynamic Adaptive Streaming over HTTP (DASH).

Figure 1:
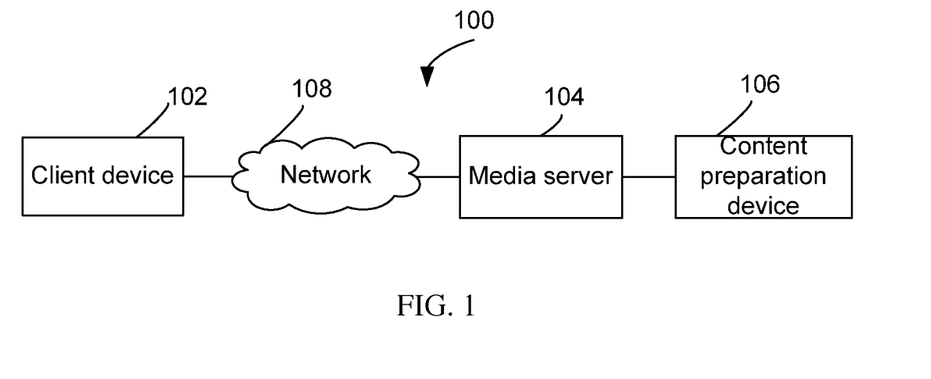
FIG. 1 is a schematic diagram of an adaptive streaming system according to an embodiment of the present invention.

FIG. 1 illustrates an adaptive streaming system 100 for streaming media data in accordance with DASH according to an embodiment of the present invention. The system 100 includes a client device 102, a media server 104, a content preparation device 106 and a network 108. The network 108 may include switches, routers, communication channels, and other devices configured to transmit data from one part of the network 108 to another part of the network 108. The network 108 may include a content delivery network (CDN) which is also referred to as a content distribution network. The client device 102 and the media server 104 are connected to the network 108, and the client device 102 first makes a request to the media server 104 for playback of media content, then the media server 104 sends the media content to the client device 102 over the network 108. In some examples, the content preparation device 106 and the media server 104 may also be coupled by the network 108 or another network, or may be directly communicatively coupled. In some examples, the content preparation device 106 and the media server 104 may comprise the same device. The client device 102 may be any type of user equipment (UE) including, for example, a personal computer, a laptop computer, a tablet computer, a smart phone, a personal digital assistant, etc. In an embodiment, the client device 102 may be a television coupled to a data processing system to receive IPTV or may be a television coupled to a cable or satellite provider set top box.

In accordance with DASH for streaming data over the network 108, media data (such as a movie or other audio/video content) may be encoded in a variety of ways and with a variety of characteristics. The content preparation device 106 may form multiple representations of the same media content. A representation may be one of a number of alternative encoded versions of audio or video data. The representations may differ by encoding types, e.g., by bit rate, resolution, and/or codec for video data and bit rate, language, and/or codec for audio data. The term representation may be used to refer to a section of encoded audio or video corresponding to a particular period of the media content and encoded in a particular way. The representations of the same media content belong to a same adaptation set which is defined in the DASH.

A representation may include one or more segments. A segment may be uniquely referenced by an identifier, such as a uniform resource locator (URL), uniform resource name (URN), or uniform resource identifier (URI). A specific single segment identified by a specific URL could be requested with one HTTP GET request sent by the client device 102. Alternatively, in various embodiments of the present invention, at least some of the segments do not have specific URLs.

As noted above, representations of an adaptation set may have varying bit rates, which may allow for bandwidth adaptation. In conventional DASH techniques, this allows a client device to adapt to changing bandwidth availability by retrieving data from a representation having a bit rate that can be best accommodated by the current amount of available bandwidth. In accordance with embodiments of the invention, the media server 104 may be configured to perform bandwidth adaptation. For example, the server device 104 may receive information indicating a current amount of network bandwidth, and select one of representations accordingly based on the bandwidth, along with coding and rendering capabilities of the client device 102.

Figure 2:
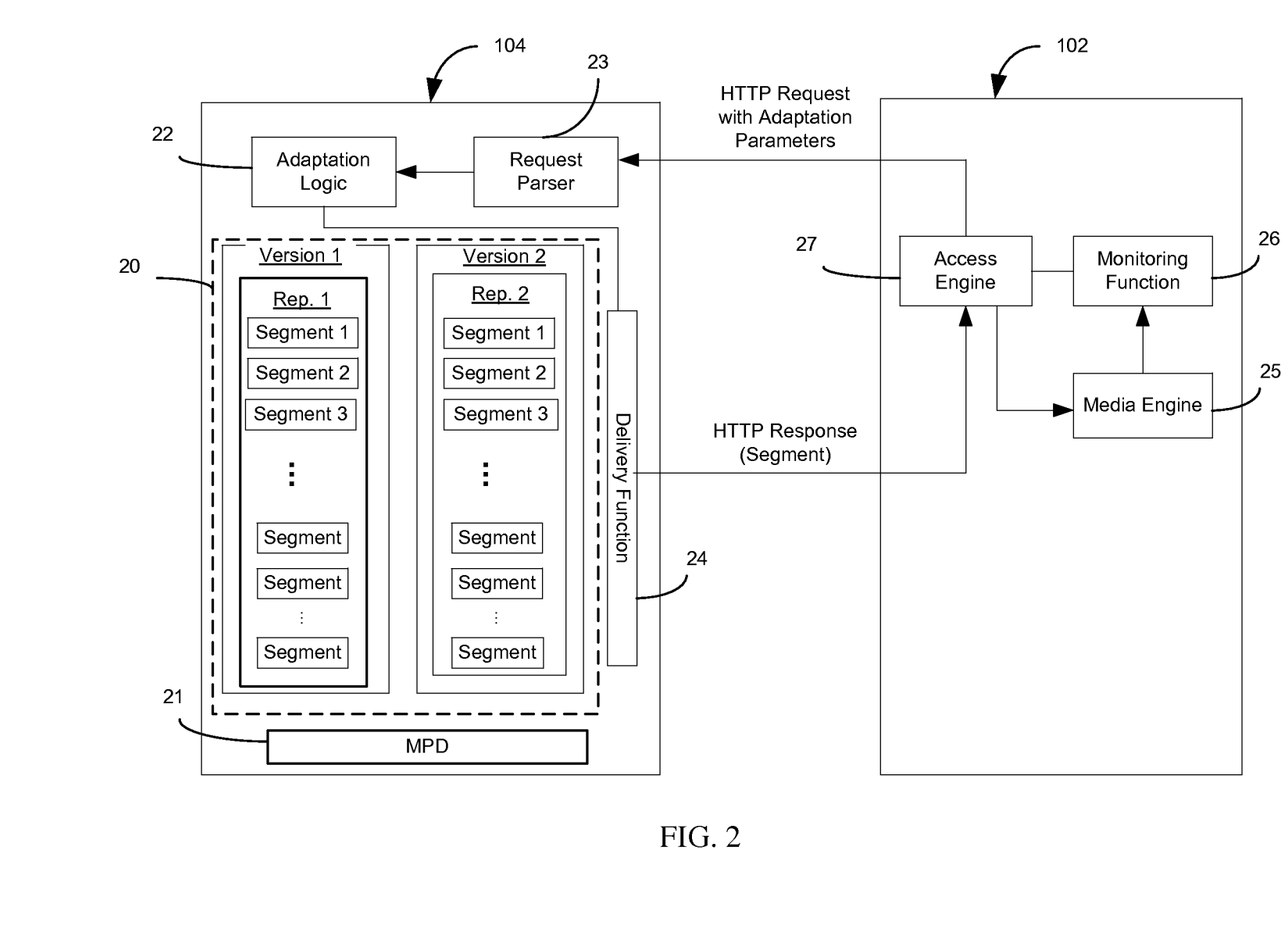
FIG. 2 illustrates an example of functional components of the media server 104 and the client device shown in FIG. 1.

FIG. 2 illustrates an example of logical components of the media server 104 and the client device 102. The media server 104 stores multiple versions (e.g., 1-2) of a media file 20, such as a movie or television program. Each version of the media file 20 may have a different quality level (e.g., screen size, spatial resolution, frame rate, or color palette) than the other version. Furthermore, although the media server 104 is described as storing one media file 20, it may store more than one media file. The media file 20 may be stored in a memory or a mass storage device of the media server 104.

Each version of the media file 20 may include one or more representations having different bit rates. For example, the version 1 may have a same screen size which is suitable for desktop. Under version 1, there may be a plurality of representations (even only one representation (i.e., representation 1) is shown) which have different bit rates for different desktop having different capabilities. Similar to version 1, the version 2 may have a screen size suitable for mobile devices, for example, mobile phones, and the version 2 may also have different representations (even only one representation (i.e., representation 2) is shown) having different bit rates.

As shown in FIG. 2, each representation (e.g., representation 1 and representation 2) is fragmented into a plurality of segments (e.g., segment 1, segment 2, segment 3 . . . and segment n). It is noted that n could be any integer depending on a real condition. Each segment has a time duration, or length, e.g., in a range of several seconds, for example, in a range of one to twenty seconds.

As shown in FIG. 2, two representations, i.e., representation 1 and representation 2 are illustrated. It is noted that more representations may be included in the media file 20. The representation 1 and the representation 2 may be in a same adaptation set. Each segment in the versions 1 and 2 may have a same time length as the corresponding segment in the other version. For example, the segment 1 in version 1 may have the same time length as the segment 1 in version 2, the segment 2 in version 1 may have the same time length as the segment 2 in version 2, and the segment 3 in version 1 may have the same time length as the segment 3 in version 2. This characteristic allows the media server 104 to switch between representations 1 and 2 on a segment-by-segment basis.

But where the segments are of versions 1-2 having different quality levels, then the data lengths/sizes of corresponding segments may be different. For example, suppose that the media file 20 is a video file, and the version 1 has a high resolution, and the version 2 has a lower resolution. Because at least corresponding ones of the segments have the same time length, then, to accommodate the different resolutions, each of these corresponding segments has a different data size. Therefore, the segment 1 in the version 1 contains more data (and, therefore, has a larger data size) than the segment 1 in the version 2.

Consequently, because where the versions 1 and 2 have different quality levels corresponding ones of the segments have the same time length but different data sizes, the rate at which the client device 102 consumes the data within one corresponding segment is different than the rate at which the client device 102 consumes the data within another corresponding segment. Using the above example where the media file 20 is a video file and the version 1 has a high resolution, and the version 2 has a lower resolution, this means that the rate (e.g., in bits per second) at which the client device 102 consumes the data within the segment 1 of the version 1 is higher than the rate at which the client device 102 consumes the data within the segment 1 in the version 2.

The media server 104 also stores a media presentation descriptor (MPD) 21 for the media file 20. In general, the MPD 21 describes the media file 20. For example, the MPD 21 may describe the content (e.g., movie, television program, music) of the media file 20, the number of versions of the media file 20, the respective quality level (in terms of, e.g., resolution, bit rate, color palette, or other rendering characteristics) of each version, the number of segments in each version, the time lengths and data sizes of the segments, and so on.

The media server 104 includes a request parser 23, an adaptation logic 22 and a delivery function 24. The request parser 23, the adaptation logic 22 and the delivery function 24 may be implemented in hardware, software, firmware, or any combination thereof. If implemented in software, the request parser 23, the adaptation logic 22 and the delivery function 24 may be stored on or transmitted over as one or more instructions or code on a memory or a mass storage device of the media server 104 and executed by a processor of the media server 104.

The request parser 23 receives a request (e.g., an HTTP request) with streaming adaptation parameters sent from the client device 102, parses the request to obtain the values of the streaming adaptation parameters. The streaming adaptation parameters are specified in the MPD 21 sent to the client device 102, are collected by the client device 102 and are sent to the media server 104 to provide a segment most suitable to the environment of the client device 102, or to provide another content, e.g., a new MPD to the client device 102. The streaming adaptation parameters may include static parameters of the environment of the client device 102, e.g., client decoding and rendering capabilities. Specifically, the static parameters may include one or more of the followings: display resolution (e.g., 800×480), codec capability of the client device 102 (e.g., H.264 base profile level 3.1), maximum buffer size (e.g., 8 MB (Megabytes)), component selected (e.g., Video+Audio) and language (e.g., Chinese). The streaming adaptation parameters may also include dynamic parameters that the client device 102 monitors about its changing environment. For example, the dynamic parameters may include one or more of the followings: current available bandwidth of the network connection (e.g., 500 kbps (kilobytes per second)), buffered media data (whose value can be measured in media time, e.g., 2.5 seconds), time of media data to be requested (which is the start time of next segment, e.g., 10.02 second), and the number of a segment to be requested (e.g., 25).

The request parser 23 sends the values of the streaming adaptation parameters to the adaptation logic 22. The adaptation logic 22 makes a segment selection or selects a new MPD based on the values of the streaming adaptation parameters. For example, the adaptation logic 22 selects the segment identified by the segment number, or switches to another representation in the same adaptation set to select a most suitable segment based on, for example, the available bandwidth. Thus, the adaptation logic 22 is able to leverage the client device 102's awareness of its capabilities and bandwidth requirements. The delivery function 24 then sends the selected segment to the client device 102 with a response. The adaptation logic 22 may also select a new MPD based on the values of the streaming adaptation parameters, the delivery function 24 then sends the new MPD to the client device 102.

The client device 102 may include an access engine 27, a monitoring function 26 and a media engine 25. The monitoring function 26 monitors the static parameters and/or the dynamic parameters, the access engine 27 receives the parameters monitored by the monitoring function 26 and constructs a request including values of the parameters to the media server 104. The access engine 26 also receives the MPD and the response from the media server 104, and sends the received segment to the media engine 25 for playback.

Figure 3:
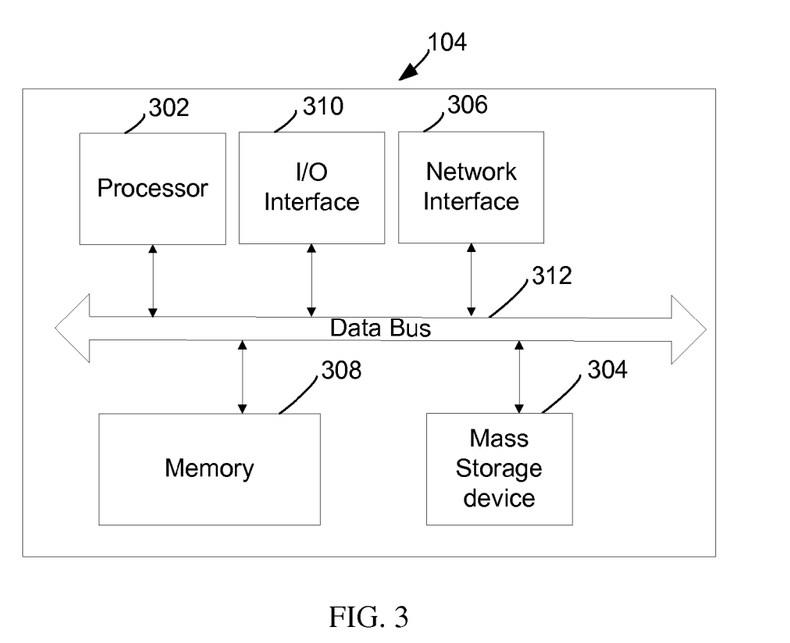
FIG. 3 is a block diagram of the media server shown in FIG. 1.

FIG. 3 is a block diagram of the media server 104 shown in FIG. 1. The media server 104 may include a processor 302, a mass storage device 304, a network interface 306, a memory 308 and an I/O interface 310, all of which are connected to a bus 312.

The bus 312 may be one or more of any type of several bus architectures including a memory bus or memory controller, a peripheral bus, video bus, or the like. The processor 302 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs, which are configured to execute programming instructions. The memory 308 may include any type of system memory such as static random access memory (SRAM), dynamic random access memory (DRAM), synchronous DRAM (SDRAM), read-only memory (ROM), a combination thereof, or the like. In an embodiment of the present invention, the memory 308 may include ROM for use at boot-up, and DRAM for program and data storage for use while executing programs.

The mass storage device 304 may include any type of storage device (e.g., computer readable storage medium) configured to store data, programs for execution by the processor 302, and other information and to make the data, programs, and other information accessible via the bus 312. The mass storage device 304 may include, for example, one or more of a solid state drive, hard disk drive, a magnetic disk drive, an optical disk drive, or the like. The mass storage device 304 is used for non-volatile storage of data and as an over-flow data storage device if the memory 308 is not large enough to hold all data. The mass storage device 304 may be used to store programs that are loaded into the memory 308 when such programs are selected for execution.

The I/O interface 310 provides interfaces to couple external input and output devices. Examples of input and output devices include the mouse/keyboard/printer coupled to the I/O interface 310.

The network interface 306 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The network interface 306 may enable the processor 302 to communicate with the network 108 and the client device 102.

The content preparation device 106 may provide separate network locations for different portions of a manifest file, such as a media presentation description (MPD) file in a format prescribed by 3GPP (Third Generation Partnership Project). That is, different portions of the manifest file may be independently addressable by, e.g., various uniform resource identifiers (URIs), such as uniform resource locators (URLs).

Figure 4:
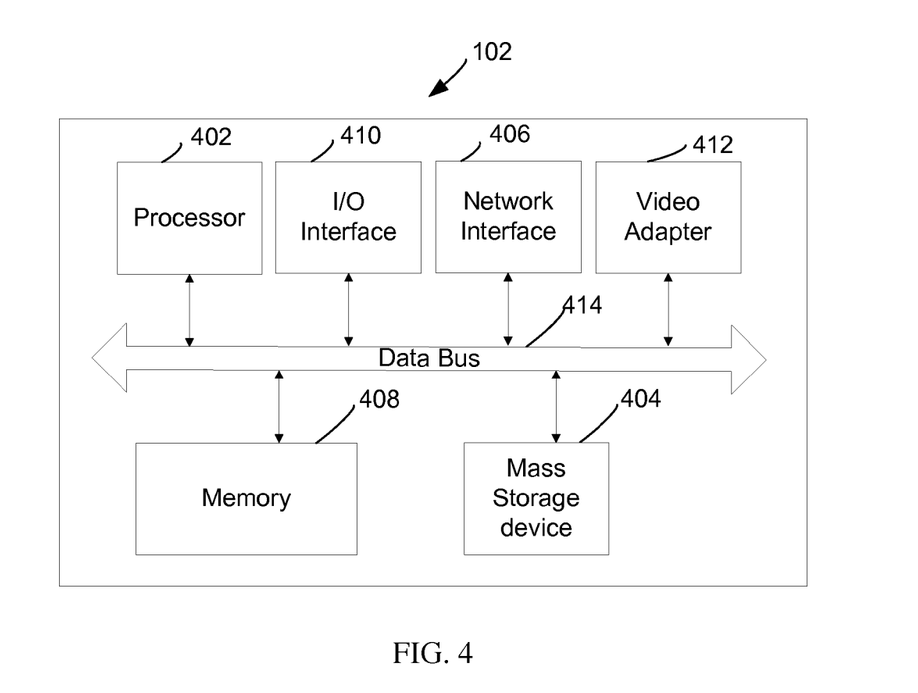
FIG. 4 is a block diagram of the client device shown in FIG. 1.

FIG. 4 illustrates an embodiment of the client device 102 shown in FIG. 1. The client device 102 may, for example, include a processor 402, a mass storage device 404, a network interface 406, a memory 408, a video adapter 412 and an I/O interface 410. Each of these devices is connected across a data bus 414.

The data bus 414 may be one or more of any type of several bus architectures including a memory bus or memory controller, a peripheral bus, video bus, or the like. The processor 402 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs, which are configured to execute programming instructions. The memory 408 may include any type of system memory such as static random access memory (SRAM), dynamic random access memory (DRAM), synchronous DRAM (SDRAM), read-only memory (ROM), a combination thereof, or the like. In an embodiment, the memory 408 may include ROM for use at boot-up, and DRAM for program and data storage for use while executing programs.

The mass storage device 404 may include any type of storage device (e.g., computer readable storage medium) configured to store data, programs for execution by the processor 402, and other information and to make the data, programs, and other information accessible via the data bus 414. The mass storage device 404 may include, for example, one or more of a solid state drive, hard disk drive, a magnetic disk drive, an optical disk drive, or the like. The mass storage device 404 is used for non-volatile storage of data and as an over-flow data storage device if the memory 408 is not large enough to hold all data. The mass storage device 404 may be used to store programs that are loaded into the memory 408 when such programs are selected for execution.

The I/O interface 410 provides any number of interfaces for the input and output of data. For example, where the client device 102 is a personal computer (PC), the I/O interface 410 may interface with user input device which may be a keyboard or a mouse. Where the client device 102 is a handheld device (e.g., PDA, mobile telephone etc.), the I/O interface 410 may interface with function keys or buttons, a touch sensitive screen, etc.

The network interface 406 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The network interface 406 may enable the processor 402 to communicate with the network 108 and the media server 104.

The video adapter 412 provides an interface to couple a display device of the client device 102. The display device may be a touch screen, a liquid crystal display (LCD) or other display device for displaying information (e.g., images, text, video, or data).

Figure 5:
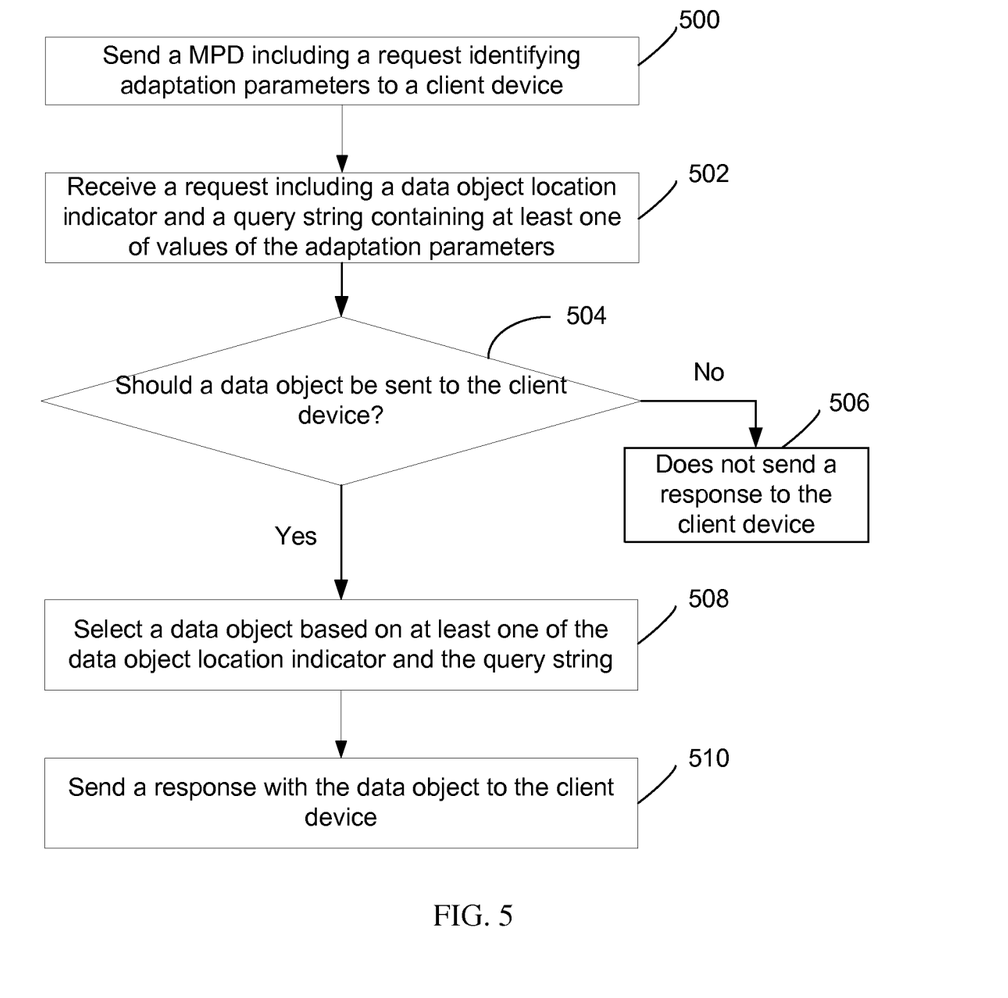
FIG. 5 is a flow chart of a method for performing adaptive streaming on media contents according to an embodiment of the present invention in connection with the network environment shown in FIG. 1.

FIG. 5 illustrates a method for performing adaptive streaming on media contents according to an embodiment of the present invention in connection with the network environment shown in FIG. 1.

At step 500, the media server 104 sends a media presentation description (MPD) file including a request identifying streaming adaptation parameters to the client device 102. The MPD requires the client device 102 to return values of the streaming adaptation parameters. The streaming adaptation parameters may include static parameters of the environment of the client device 102, e.g., client decoding and rendering capabilities. Specifically, the static parameters may include one or more of: resolution, codec capability, maximum buffer size, component selected and language. The streaming adaptation parameters may also include dynamic parameters that the client device 102 monitors about its changing environment. For example, the dynamic parameters may include one or more of: current available bandwidth of a network connection between the media server 104 and the client device 102, buffered media data, time of media data to be requested, and the number of a segment to be requested.

In order to ensure semantic understanding of the streaming adaptation parameters communicated among MPD providers (e.g., the content preparation device 106), DASH clients (e.g., the client device 102) and media segment servers (e.g., the media server), the streaming adaptation parameters need to be well defined, like the parameters in the current URL template construction schemes in DASH, and the streaming adaptation parameters may also come from existing standards like Security Assertion Markup Language (SAML) (e.g., for security related tokens), or MPEG-21 digital item adaptation (DIA) (e.g., for user environment definitions), depending on the nature of use of parameters.

In an example of the embodiment, a new element which may be called URLParameter is inserted in the MPD to specify each of the streaming adaptation parameters. The URLParameter element is used to capture at least the following pieces of information:

1) a required identification, "id", of the parameter; it can be used as a token $id to be replaced when used as part of a parameterized URL, or a "name" (e.g., the portion before "=") when the parameter is used for a query string. This should be unique with respect to the name space of the parameter.

2) an optional value, "value", to capture any known (static) value of the parameter. It is the actual value to replace the token $id when used as part of a parameterized URL, or a "value" (e.g., the portion after "=") when used for a query string. If this information is missing, it means that this parameter value has to be gathered and provided by the client device when constructing the URL. It is noted that the actual value of this piece information needs to be encoded in a way that can be used as part of a URL or a URL with query strings.

3) an optional name space, "namespace", for any namespace the parameter is from. When omitted, the default namespace is the one for DASH.

4) an optional purpose, "queryString", to indicate if the purpose of this parameter is for insertion. When omitted, the default can be set for insertion.

The URLParameter element may further include an optional usage requirement, "required", to indicate if this parameter is required (i.e., mandatory) or optional. A parameter for insertion must be required, whereas a parameter for query string that is optional does not have to be added into the URL. This provides flexibility to accommodate clients who may not be able to provide any value for this parameter or servers who are able to process URLs without this parameter. When omitted, the default is that the parameter is required.

The URLParameter element may be placed optionally at the MPD, Period, AdaptationSet and Representation levels, so the URLParameter element can be applied to all the media segments within its scope. Moreover, more schemes can be introduced to make the URLParameter apply to some (not all) media segments within its scope. The type of the URLParameter element can be defined in a number of ways in the XML scheme. The URLParameter element is illustrated below, as an example.

```
<xs:complexType name="URLParameterType">
  <xs:attribute name="id" type="xs:NCName" use="required"/>
  <xs:attribute name="value" type="xs:string" use="optional"/>
  <xs:attribute name="namespace" type="xs:string" use="optional"/>
  <xs:attribute name="queryString" type="xs:boolean" use="optional" default="false"/>
  <xs:attribute name="required" type="xs:boolean" use="optional" default="true"/>
</xs:complexType>
```

In the definition above, the semantics of attributes @id, @value, and @namespace are straightforward. The attribute @queryString takes a Boolean value, with "false" to indicate the parameter is for URL insertion and "true" for being an additional URL query string. When omitted, the default value of @queryString is "false", indicating that the parameter is for URL insertion. The attribute @required also takes a Boolean value, with "false" to indicate the parameter is optional and "true" required.

The MPD may also specify a segment template that requires the client device 102 to return values of the streaming adaptation parameters in a particular format.

At step 502, the media server 104 receives a request including a data object location indicator and a query string containing at least one of values of the streaming adaptation parameters from the client device 102. In various embodiments of the present invention, the data object location indicator can be, for example, a path portion of a URL, and the query string can be, for example, a query string portion of the URL. Alternatively, the data object location indicator can be interpreted as a URL, and the query string maybe follow the URL. After the client device 102 receives the MPD, the client device 102 collects the values of the streaming adaptation parameters and constructs an URL which includes the values of the streaming adaptation parameters according to, for example, the segment template in the MPD. In various examples, at least one of the values should be contained in a query string portion of the URL, and the other values of the streaming adaptation parameters may be contained in a path portion of the URL.

In one example, the MPD may include content as follows:

```
<BaseURL>http://cdn1.example.com/video/</BaseURL>
<URLParameter id="RepNumber"/>
<URLParameter id="SegNumber"/>
<URLParameter id="AvailableBandwidth"/>
<SegmentTemplate duration="4" startNumber="1"
    media="$RepNumber$_$SegNumber$.mp4v?bw=
    $AvailableBandwidth$"/>
```

In this example, the media server 104 requests the client device 102 to return a representation number, a segment number and an available bandwidth of the network. The media server 104 also requires a particular template to return these values of the streaming adaptation parameters. For example, if the values of the parameters are: RepNumber=1, SegNumber=2, and AvailableBandwidth=80000. The client device 102 may construct an URL as follows:
    http://cdn1.example.com/video/
        1_2_thisIsARearllyLongPath.mp4v?bw=80000

In this example, the representation number and the segment number are contained in the path portion of the URL, and the value of bandwidth is contained in a query string portion of the URL.

In another example, the MPD may include contents as follows:

```
<BaseURL>http://cdn1.example.com/video/</BaseURL>
<URLParameter id="RepNumber"/>
<URLParameter id="SegNumber"/>
<URLParameter id="AvailableBandwidth" queryRequest="true"/>
<SegmentTemplate duration="4" startNumber="1"
    media="$RepNumber$_$SegNumber$.mp4v"/>
```

In this example, the media server 104 requests three streaming adaptation parameters, i.e., the representation number, the segment number and the available bandwidth. Since the value of the attribute "querystring" of the available bandwidth is "true", the client device 102 should return the value of the available bandwidth as a query string of a URL. If the values of the parameters are: RepNumber=1, SegNumber=2, and AvailableBandwidth=80000, the client device 102 may construct a URL as follows:
    http://cdn1.example.com/video/
        1_2.mp4v?AvailableBandwidth=80000

At step 502, after the client device 102 constructs the URL, the client device 102 sends a request (e.g., a HTTP request such as a HTTP GET request) for a segment according to the URL with a query parameter (that is, the value in the query string portion of the URL). However, unlike the prior art, the URL in the embodiments of the present invention does not specify a particular segment. In this manner, the media server 104 may flexibly choose different ways to respond the request. For example, the media server 104 may make a bandwidth adaptation based on the values of the streaming adaptation parameters, and select a segment of a representation which is suitable for the bandwidth. The media server 104 may also choose to send a new MPD rather than a segment to the client device 102 based on the values of the streaming adaptation parameters. The media server 104 can even choose not to respond the request if, for example, when the media server 104 determines that the client device 102 is not authorized to get the segment corresponding to the segment number in the request.

At step 504, the media server 104 determines whether a data object should be sent to the client device 102. The data object is, for example, a segment or a new MPD file.

At step 506, if the media server 104 determines not to send a data object to the client device 102, the media server 104 may not send a response to the client device 102. For example, the media server 104 may request the client device 102 to return authorization information to the media server 104 in step 500. If the media server 104 finds that the client server 102 does not have an authorization to get a segment identified in the request for playback, the media server 104 may not send a response to the client device 102. Alternatively, the media server 104 may return a response indicating a reason why the media server 104 does not send the requested segment to the client device 102.

At step 508, if the media server 104 determines to send a data object to the client device 102, the media server 104 selects a data object based on the values of the adaptation parameters. In this disclosure, selecting a data object based on the values of the adaptation parameters means that the media server 104 may select a data object based on one or more of the values of the streaming adaptation parameters. In this step, the media server 104 may send a segment or a new MPD to the client device 102 as a response to the request.

In one example, the client device 102 sends an request to request a segment, the request includes the values of the streaming adaptation parameters, for example, the segment number (e.g., 2) and the available bandwidth (e.g., 800 kbps). After the media server 104 receives the request, the media server 104 parses the request to obtain the values. If the media server 104 finds that there is a segment of a representation having a bit rate of 800 kbps, the media server 104 may select this segment and sends the segment to the client device 102. The media server 104 may find that there is not a segment of a representation has a bit rate of 800 kbps. In this situation, the media server 104 may make a bandwidth adaptation to find a suitable segment in a representation which satisfies the bandwidth. For example, the media server 104 may select a segment from a representation having a bit rate less than 800 kbps, e.g., 700 kbps. Alternatively, the media server 104 may also select a segment from a representation having a bit rate which is great than 800 kbps, e.g., 900 kbps. It is noted that, the values of the streaming adaptation parameters may also include resolution, screen size or any other streaming adaptation parameters described in this disclosure. The media server 104 may make an adaptation to select a suitable segment, and send the segment to the client device 102. Alternatively, the media server 104 may encode media data to obtain a segment which is accommodated by the bandwidth if the media server 104 finds that there is not a suitable segment which is already stored in the media server 104. For example, the media server 104 may encode media data in a bit rate equal to 800 kbps to obtain a segment, and sends the segment that has a bit rate of 800 kbps to the client device 102. Therefore, the client device 102 can receive a suitable segment so as to improve the quality of experience (QoE) of a user.

In other example, the media server 104 may return a new MPD to the client device 102 instead of a segment. For example, for live media contents (e.g., a game), a commercial advertisement may be inserted when the game is time-out. However, sometimes the time-out cannot be determined in advance. In this situation, a new MPD with new information then is necessary. For example, the new MPD may include information about the segment (i.e., the advertisement), for example, the segment number, the start time, etc. This would change the sequence of the segments in the old MPD. For example, the segment number in the request is 8, but the segment number of the segment of advertisement is 7, the media server 104 does not send a segment to the client device 102. Instead, the media server 104 sends the new MPD to the client device 102, then the client device 102 may request a segment based on the new MPD. For on-demand contents, if the contents are changed, for example, an advertisement is inserted into the contents, a new MPD also needs to be sent to the client device 102.

After the data object (e.g., the segment or new MPD) is selected, the media server 104 sends the data object to the client device 102 via a response. After receiving the response, the client device 102 can playback the content of the segment, or sends out a request based on the new MPD to request a segment.

The various embodiments described herein are described in the general context of method steps or processes, which may be implemented in one embodiment by a computer program product which is accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

What is claimed is:

1. A media server for performing adaptive streaming on media contents to be streamed to a client device, comprising:
    a network interface configured to:
        send to the client device a media presentation description (MPD) file comprising a first request for requesting streaming adaptation parameters; and
        receive from the client device a second request comprising a data object location indicator and a query string containing values of one or more of the streaming adaptation parameters, wherein the streaming adaptation parameters describe an environment of the client device independent of the media contents, and wherein the streaming adaptation parameters comprise a measured bandwidth; and
    a processor coupled to the network interface and configured to:
        after receiving the second request, select a data object based on the data object location indicator and the streaming adaptation parameters; and
        send, via the network interface, a response including the data object to the client device.

2. The media server according to claim 1, wherein the data object is a segment of a representation of the media contents.

3. The media server according to claim 2, wherein the values comprise a first value indicative of the measured bandwidth, and wherein the measured bandwidth is of a network connection between the media server and the client device.

4. The media server according to claim 3, wherein the data object location indicator comprises a segment indicator, and wherein the first value is contained in the query string.

5. The media server according to claim 3, wherein the segment is suitable for the measured bandwidth.

6. The media server according to claim 3, wherein selecting the segment comprises encoding media data in a bit rate which is accommodated by the measured bandwidth to obtain the segment.

7. The media server according to claim 1, wherein the data object is a second MPD file.

8. The media server according to claim 7, wherein the values of the streaming adaptation parameters comprise a first segment number and the second MPD file comprises a second segment number corresponding to a segment of an advertisement, and wherein selecting the second MPD file comprises determining that the second segment number is before the first segment number in sequence.

9. A method for performing adaptive streaming on media contents by a media server, the method comprising:
    sending, to a client device via a network interface of the media server, a media presentation description (MPD) file comprising a first request for streaming adaptation parameters to be provided by the client device;
    receiving, via the network interface, a second request from the client device, the second request comprising a data object location indicator and a query string containing values of one or more of the streaming adaptation parameters, wherein the streaming adaptation parameters describe an environment of the client device independent of the media contents, and wherein the streaming adaptation parameters comprise a measured bandwidth;
    selecting, by a processor of the media server after receiving the second request, a data object based on the data object location indicator and the streaming adaptation parameters; and sending, via the network interface, a response with the data object to the client device.

10. The method according to claim 9, wherein the data object is a segment of a representation of the media contents.

11. The method according to claim 10, wherein the values comprise a segment number and a first value indicative of the measured bandwidth, and wherein the measured bandwidth is of a network connection between the media server and the client device.

12. The method according to claim 11, wherein the segment number is contained in the data object location indicator, and wherein the first value is contained in the query string.

13. The method according to claim 11, wherein the segment is suitable for the measured bandwidth.

14. The method according to claim 11, wherein selecting the segment comprises encoding media data in a bit rate which is accommodated by the measured bandwidth to obtain the segment.

15. The method according to claim 9, wherein the data object selected is a second MPD file.

16. The method according to claim 15, wherein the values of the streaming adaptation parameters comprise a first segment number and the second MPD file comprises a second segment number corresponding to a segment of an advertisement, and wherein selecting the second MPD file comprises determining that the second segment number is before the first segment number in sequence.

17. A non-transitory computer-readable medium storing instructions executable by a processor in a media server to cause the media server to;
send, to a client device via a network interface of the media server, a media presentation description (MPD) file comprising a first request for streaming adaptation parameters to be provided by the client device;
receive, via the network interface, a second request from the client device, the second request comprising a data object location indicator and a query string containing values of one or more of the streaming adaptation parameters, wherein the streaming adaptation parameters describe an environment of the client device independent of media contents, and wherein the streaming adaptation parameters comprise a measured bandwidth;
select, by the processor after receiving the second request, a data object based on the received streaming adaptation parameters; and
send, via the network interface, a response with the data object to the client device.

18. The non-transitory computer-readable medium according to claim 17, wherein the data object is a segment of a representation of the media contents.

19. The non-transitory computer-readable medium according to claim 18, wherein the values comprise a segment number and a first value indicative of the measured bandwidth, and wherein the measured bandwidth is of a network connection between the media server and the client device.

20. The non-transitory computer-readable medium according to claim 17, wherein the data object is a second MPD file.

21. The media server of claim 1, wherein the first request indicates that a process of streaming adaptation parameters insertion is required.

22. The media server of claim 1, wherein the first request indicates that a process of streaming adaptation parameters is optional.

23. The media server of claim 1, wherein the second request further comprises a query string carrying the values of the one or more streaming adaptation parameters.

24. A client device comprising:
a receiver configured to receive from a first server a media presentation description (MPD) comprising a first request for streaming adaptation parameters;
a processor coupled to the receiver and configured to:
determine a measured bandwidth of a network connection of the client device; and
generate a second request comprising a data object location indicator and a query string containing the streaming adaptation parameters, wherein the streaming adaptation parameters comprise the measured bandwidth and describe an environment of the client device independent of media contents; and
a transmitter coupled to the processor and configured to transmit the second request to a second server,
wherein the receiver is further configured to receive, from the second server and based on the data object location indicator and the streaming adaptation parameters, a response comprising a data object.

* * * * *

UNITED STATES PATENT AND TRADEMARK OFFICE
CERTIFICATE OF CORRECTION

PATENT NO.         : 9,917,872 B2                                          Page 1 of 1
APPLICATION NO.    : 14/158477
DATED              : March 13, 2018
INVENTOR(S)        : Xin Wang et al.

It is certified that error appears in the above-identified patent and that said Letters Patent is hereby corrected as shown below:

On the Title Page

Below Abstract, delete "24 Claims, 4 Drawing Sheets" and insert --23 Claims, 4 Drawing Sheets--.

In the Claims

Column 14, Lines 23-44 delete Claim 23 and 24 and substitute with the following Claim 23:
23. A client device comprising:
    a receiver configured to receive from a first server a media presentation description (MPD) comprising a first request for streaming adaptation parameters;
    a processor coupled to the receiver and configured to:
        determine a measured bandwidth of a network connection of the client device; and
        generate a second request comprising a data object location indicator and a query string containing the streaming adaptation parameters, wherein the streaming adaptation parameters comprise the measured bandwidth and describe an environment of the client device independent of media contents; and
    a transmitter coupled to the processor and configured to transmit the second request to a second server,
    wherein the receiver is further configured to receive, from the second server and based on the data object location indicator and the streaming adaptation parameters, a response comprising a data object.

Signed and Sealed this
Thirtieth Day of October, 2018

Andrei Iancu
*Director of the United States Patent and Trademark Office*